W. KNAPP.
GRAVITY SUPPORTING DEVICE.
APPLICATION FILED MAY 1, 1919.
1,331,569.
Patented Feb. 24, 1920.
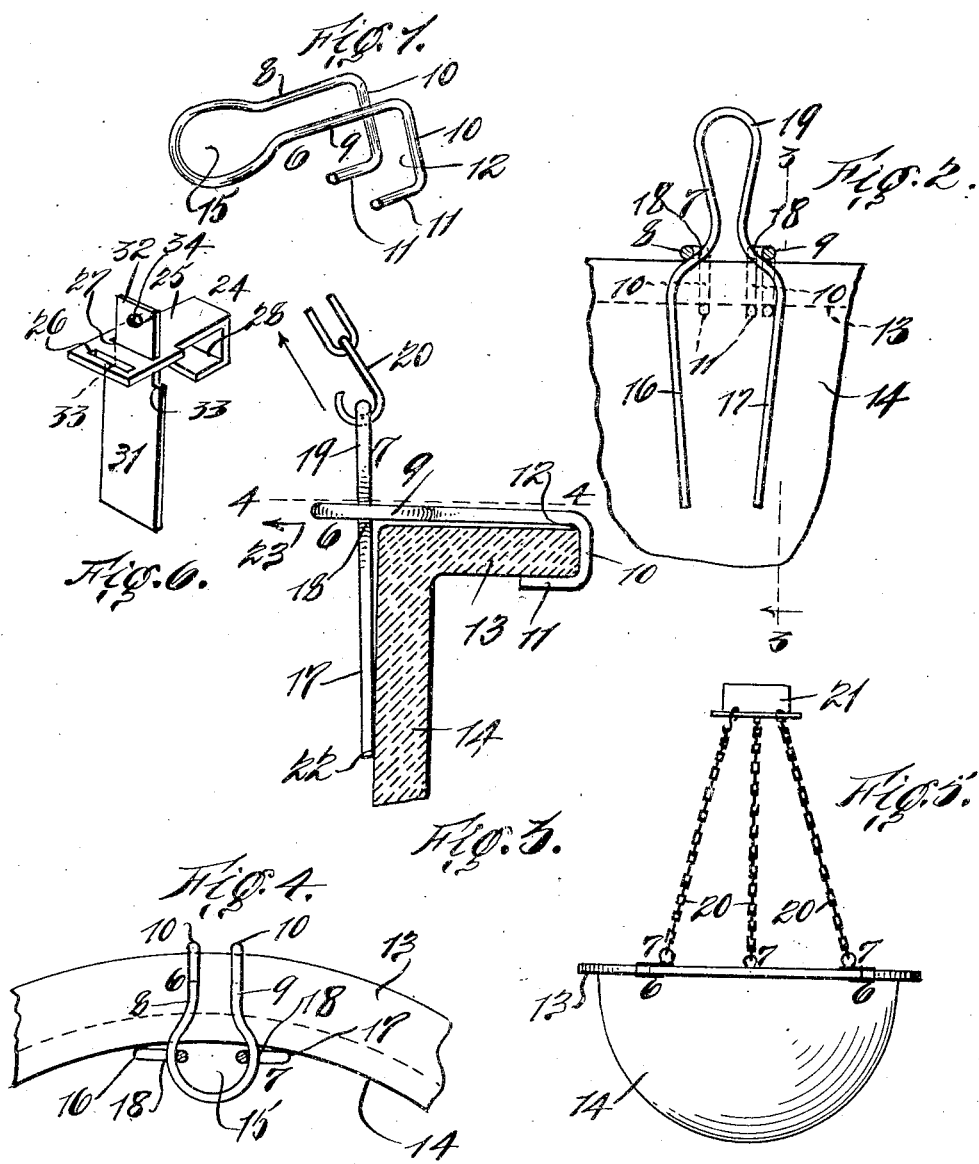
INVENTOR
William Knapp
BY
ATTORNEY

UNITED STATES PATENT OFFICE.

WILLIAM KNAPP, OF BAYONNE, NEW JERSEY, ASSIGNOR TO WILLIAM KNAPP AND ERNEST W. BOYCE, BOTH OF BROOKLYN, NEW YORK, COPARTNERS DOING BUSINESS UNDER THE TRADE NAME OF AMERICAN FIXTURE DEALERS SYNDICATE, OF NEW YORK, N. Y.

GRAVITY SUPPORTING DEVICE.

1,331,569.  Specification of Letters Patent.  Patented Feb. 24, 1920.

Application filed May 1, 1919. Serial No. 294,127.

*To all whom it may concern:*

Be it known that I, WILLIAM KNAPP, a citizen of Germany, residing at Bayonne, Hudson county, State of New Jersey, have invented certain new and useful Improvements in Gravity Supporting Devices, of which the following is a full, clear, and exact description.

This invention relates to improvements in devices for suspending shades, but more properly speaking to devices for attaching suspension means, such as chains, to said shades. One of the objects of my invention is to provide means for attaching chains to shades without the necessity of providing openings in the shades. My improvement is more especially adapted for flanged glass shades of the inverted type and is arranged to operate or grip the shade through the medium of gravity, that is to say, the device is caused to grip by the weight of the shade. By forming a fastening device in accordance with my improvement, bolts, screws or threaded openings, in either the shade or fastener, are obviated.

To produce an inexpensive and efficient fastening device, I form the same out of wire by suitable forming tools.

In connection with the following description, reference will be had to the accompanying drawing, wherein :—

Figure 1 is a perspective view of one of the members of my improved fastening device;

Fig. 2 is a diagrammatic view, partly in section, of the device assembled, a portion of a shade being also illustrated;

Fig. 3 is a sectional side view thereof, the section being taken on a line 3—3 in Fig. 2;

Fig. 4 is a sectional top plan view, the section being taken on a line 4—4 in Fig. 3;

Fig. 5 is a diagrammatic view, illustrating the device in use; and Fig. 6 is an assembled perspective view of a modified form of my invention.

My improved device consists of a flange engaging member 6 and a locking member 7 therefor. The flange engaging member consists of a strip of suitable wire bent over upon itself to form parallel frame members 8 and 9 which, intermediate the ends thereof, are bent downwardly as at 10. The downwardly bent portion of each member 8 and 9 is bent inwardly, as at 11, to form jaws 12 to receive the flange 13 of a glass shade 14. The opposite end of the flange engaging member is formed into a substantially circular eye 15 to be engaged by the locking member 7.

The locking member 7 consists of a strip of suitable wire bent over upon itself to form leg-members 16 and 17, having shoulders 18, intermediate the ends thereof, to engage the eye portion 15 of the flange engaging member 6. One end of the locking member 7 is looped as at 19 for the engagement of a chain 20 or other suspension medium.

To apply the fastening device, the member 6 will be caused to engage the flange of a shade by slipping the inturned ends 11 under the flange to cause it to enter the jaws 12. The looped end 19 of the locking device 7 will now be passed through the eye 15 and moved upwardly until the shoulders 18 engage the flange engaging member 6, after which the chains 20 will be attached. This operation will be repeated until the desired number of fastening devices are applied to the shade (usually three) and chains 20 attached thereto. The opposite end of each chain 20 will be connected to a suitable ceiling fixture, herein indicated by 21. After the fasteners and chains have been attached, the weight of the shade 14 will cause the locking element 7 to draw the coöperating element 6 firmly against the flange 13; in fact, the shade cannot drop away from the fasteners, as the element 7 acts as a key so long as it engages the element 6. The shoulders 18 on the element 7 prevent it from being drawn through the eye 15, as the direction of pull will be in the direction of the arrow Fig. 3. The element 7 will act as a lever, fulcrumed at 22, to draw the flange engaging member 6 of the fastener in the direction of the arrow 23 in Fig. 3. It is not necessary that this side pull, so to speak, should be exerted to cause the fastener to remain connected to the shade; a vertical stress would maintain elements 6 and 7 connected, and so long as they are connected the fastener as a whole cannot be removed prematurely or otherwise from the shade. It is the weight of the shade that causes members 6 and 7 to remain connected after said shade is suspended by chains or otherwise. My improved fastener is a gravity actuated clamp, that is to say, is dependent upon the weight of the shade to cause it to grip. My improved fastener may be applied to any shade having an annular flange or projection. Fig. 6 illustrates a flange engaging member 24 made of strip metal having a plate portion 25 provided with a plurality of openings 26 and 27. The plate member carries a jaw 28 to engage the flange of a shade. The key-member 31 consists of a flat strip reduced at 32 to provide shoulders 33 and a tongue, the tongue being passed through either opening 26 or 27 according to the width of the flange to be engaged. The tongue is provided with an opening 34 for the securement thereto of a chain.

Having described my invention, what I claim is:—

1. A fastening device for shades comprising a strip of flat metal having a flange engaging jaw at one end thereof, said strip being provided with a plurality of openings adjacent the opposite end thereof, and a key-member to engage any one of said openings.

2. A fastening device for shades comprising a strip of flat metal having a flange engaging jaw at one end thereof, said strip being provided with a plurality of openings adjacent the opposite end thereof, and a key-member consisting of a flat strip reduced at one end to provide shoulders, said reduced portion being provided with an opening for the engagement of a chain or the like, and arranged to pass through any one of said openings.

3. A fastening device to connect a shade and suspension means, comprising a flange-engaging-member having an opening therethrough, and a key-member arranged to be passed partly through said opening and to engage the flange engaging member to constitute a lever when in position on a shade.

Signed at New York city, N. Y., this 29 day of April, 1919.

WILLIAM KNAPP.

Witnesses:
EDWARD A. JARVIS,
MAURICE BLOCK.